United States Patent
Cook et al.

(10) Patent No.: US 8,766,483 B2
(45) Date of Patent: Jul. 1, 2014

(54) WIRELESS POWER RANGE INCREASE USING PARASITIC ANTENNAS

(75) Inventors: Nigel P. Cook, El Cajon, CA (US); Lukas Sieber, Olten (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 965 days.

(21) Appl. No.: 12/323,479

(22) Filed: Nov. 26, 2008

(65) Prior Publication Data

US 2009/0134712 A1 May 28, 2009

Related U.S. Application Data

(60) Provisional application No. 60/990,908, filed on Nov. 28, 2007.

(51) Int. Cl.
*H01F 27/42* (2006.01)
*H01F 37/00* (2006.01)
*H01F 38/00* (2006.01)

(52) U.S. Cl.
USPC .......................................................... 307/104

(58) Field of Classification Search
USPC .......................................... 307/104; 320/108
See application file for complete search history.

(56) References Cited

U.S. PATENT DOCUMENTS

| | | | |
|---|---|---|---|
| 2,851,537 A | 9/1958 | Rosenberg et al. | |
| 3,042,750 A | 7/1962 | Siezen | |
| 5,440,296 A | 8/1995 | Nelson | |
| 5,619,078 A * | 4/1997 | Boys et al. | 307/85 |
| 5,831,841 A | 11/1998 | Nishino | |
| 6,172,608 B1 | 1/2001 | Cole | |
| 6,266,052 B1 | 7/2001 | Kayser et al. | |
| 6,317,338 B1 | 11/2001 | Boys | |
| 7,825,543 B2 | 11/2010 | Karalis et al. | |
| 2003/0210106 A1 | 11/2003 | Cheng et al. | |
| 2004/0100413 A1 | 5/2004 | Waldner | |
| 2005/0006473 A1 | 1/2005 | Deguchi et al. | |
| 2005/0127867 A1 | 6/2005 | Calhoon et al. | 320/108 |
| 2005/0131495 A1 | 6/2005 | Parramon et al. | 607/61 |
| 2006/0038730 A1 | 2/2006 | Parsche | |
| 2007/0222542 A1 | 9/2007 | Joannopolous | |
| 2008/0191897 A1 | 8/2008 | McCollough | 340/625.22 |
| 2010/0231053 A1* | 9/2010 | Karalis et al. | 307/104 |

FOREIGN PATENT DOCUMENTS

| | | |
|---|---|---|
| CN | 101023600 A | 8/2007 |
| EP | 1555717 | 7/2005 |
| JP | 52006485 U | 1/1977 |

(Continued)

OTHER PUBLICATIONS

International Search Report and Written Opinion—PCT/US2008/084767, International Search Authority—European Patent Office—Aug. 3, 2009.

(Continued)

*Primary Examiner* — Carlos Amaya

(74) *Attorney, Agent, or Firm* — Knobbe, Martens, Olson & Bear, LLP

(57) ABSTRACT

Wireless power transfer is created using a first antenna that is part of a magnetic resonator, to create a magnetic field in an area of the first antenna. One or more parasitic antennas repeats that power to create local areas where the power is more efficiently received.

56 Claims, 8 Drawing Sheets

(56) References Cited

FOREIGN PATENT DOCUMENTS

| | | |
|---|---|---|
| JP | 56027512 | 3/1981 |
| JP | 62019808 U | 2/1987 |
| JP | 05183318 | 7/1993 |
| JP | 05091012 U | 12/1993 |
| JP | 6334418 A | 12/1994 |
| JP | 08154012 | 6/1996 |
| JP | 9074305 A | 3/1997 |
| JP | 2000138621 A | 5/2000 |
| JP | 2002508916 A | 3/2002 |
| JP | 2003224415 A | 8/2003 |
| JP | 2004200859 A | 7/2004 |
| JP | 2005006440 A | 1/2005 |
| JP | 2005033413 A | 2/2005 |
| JP | 2005218012 A | 8/2005 |
| JP | 2005323019 A | 11/2005 |
| JP | 2006238398 A | 9/2006 |
| KR | 1020060040312 | 5/2006 |
| WO | WO-9850993 A1 | 11/1998 |
| WO | 2006011769 A1 | 2/2006 |
| WO | WO-2007029438 A1 | 3/2007 |

OTHER PUBLICATIONS

"Wireless Non-Radiative Energy Transfer", MIT paper, publication and date unknown, believed to be 2007.

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

Supplementary European Search Report—EP08877111—Search Authority—Munich—Mar. 20, 2014.

* cited by examiner

WIRELESS POWER RANGE INCREASE USING PARASITIC ANTENNAS

This application claims priority from provisional application No. 60/990,908, filed Nov. 28, 2007, the entire contents of which disclosure is herewith incorporated by reference.

BACKGROUND

Our previous applications have described magneto mechanical systems. Previous applications by Nigel Power LLC have described a wireless powering and/or charging system using a transmitter that sends a magnetic signal with a substantially unmodulated carrier. A receiver extracts energy from the radiated field of the transmitter. The energy that is extracted can be rectified and used to power a load or charge a battery.

Our previous applications describe non-radiative transfer of electrical energy using coupled magnetic resonance. Non-radiative may mean that both the receive and transmit antennas are "small" compared to the wavelength, and therefore have a low radiation efficiency with respect to Hertzian waves. High efficiency can be obtained between the transmit resonator and a receive resonator.

SUMMARY

The present application describes extending a range over which this power transmission can occur using parasitic antennas.

Another aspect describes tuning the parasitic antennas.

DETAILED DESCRIPTION

The classical principle of non-radiative energy transfer is based on Faraday's induction law. A transmitter forms a primary and a receiver forms a secondary separated by a transmission distance. The primary represents the transmit antenna generating an alternating magnetic field. The secondary represents the receive antenna that extracts electrical power from the alternating magnetic field using Faraday's induction law.

$$-\mu_0 \frac{\partial H(t)}{\partial t} = \nabla \times E(t)$$

where $\nabla \times E(t)$ denotes curl of the electrical field generated by the alternating magnetic field The inventors recognize, however, that the weak coupling that exists between the primary and secondary may be considered as a stray inductance. This stray inductance, in turn, increases the reactance, which itself may hamper the energy transfer between primary and secondary.

The transfer efficiency of this kind of weakly coupled system can be improved by using capacitors that are tuned to the precise opposite of the reactance of the operating frequency. When a system is tuned in this way, it becomes a compensated transformer which is resonant at its operating frequency. The power transfer efficiency is then only limited by losses in the primary and secondary. These losses are themselves defined by their quality or Q factors.

Compensation of stray inductance may also be considered as part of the source and load impedance matching in order to maximize the power transfer. Impedance matching in this way can hence increase the amount of power transfer.

According to a current embodiment, a technique is described for powering a wirelessly powered device which can be located anywhere within an room. An embodiment powers the entire room and provides power for a receiver anywhere within the room, independent of the exact position of that receiver.

The techniques as disclosed herein operate at a frequency of 135 kHz, the so-called ISM band. However, other techniques may operate at other frequencies. For example, other embodiments may operate at a frequency of 13.56 MHz.

An embodiment uses passive repeaters, referred to herein as parasitic antennas, to extend the range of the wireless power. Power is transferred from a wireless transmitter to all of the parasitic antennas in range. These parasitic antennas form tuned resonators that create areas of maximum power transmission. A wireless power receiver is in the range of the parasitic antenna.

Figure 1:
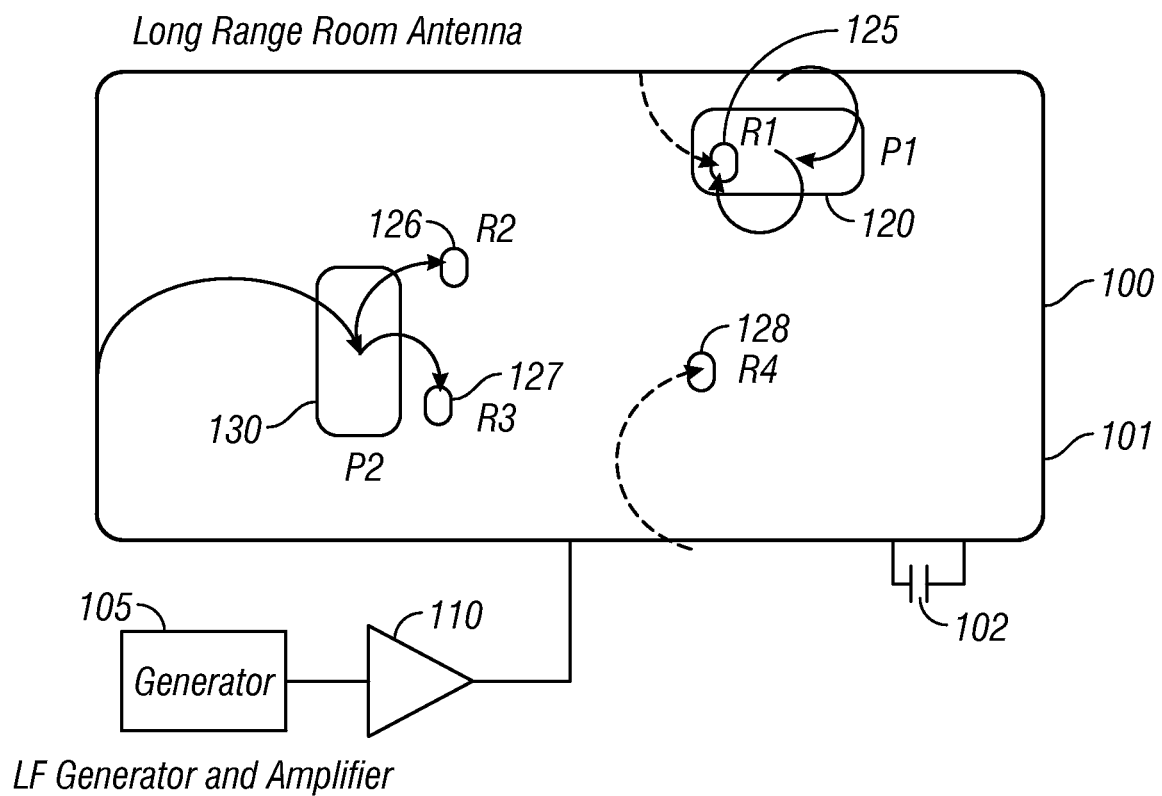
FIG. 1 shows a block diagram of wireless power transmission using both main and a parasitic transmission antennas.

FIG. 1 illustrates a block diagram. A "long-range" room antenna 100 may be fed with magnetic power by a magnetic frequency generator 105, and amplifier 110. The magnetic generator 105 may produce an output having a frequency which is resonant with the antenna 100. Antenna 100 is formed of an inductive loop 101 as shown, and a separate capacitor 102. In another embodiment, the self capacitance of the loop 101 may serve as the capacitor. The LC constant of the loop and capacitor is substantially resonant with the frequency created by the generator and amplifier.

This creates magnetic field areas near antenna 100. In an embodiment, the antenna 100 may traverse a perimeter of the room. However, since the antenna 100 produces as much signal inside the loop antenna as it does outside the loop, it may be more efficient to place the antenna more toward the center of a room. Therefore, one embodiment may place the antenna, for example, in the floor, or along edges of a table. Any receiver such as 125 can receive power directly from the room antenna 100 and can also receive re-radiated power from the antenna 120.

The parasitic antenna 120 receives the magnetic field power from the antenna 100 and reradiates to an area close to 120. The receiver 125 may be a receiver of magnetic power.

The other receivers shown as 126, 127 can also receive power in the same way, receiving part or all of their power from the main antenna 100, and part of the power that is re-radiated by another parasitic antenna 130. Alternately, and in this embodiment, it is shown that the receivers 126 and 127 receive power only from the parasitic antenna 130. Yet another receiver 128 is not near a parasitic antenna, and receives magnetically transmitted power, accordingly, only from the main antenna 100.

The loop antennas may all have the same orientation with respect to the magnetic field, or may each have different orientations with respect to the magnetic field.

The capability of a receiver antenna to relay power may be mainly dependent on the coupling between the receiver antenna and the room antenna. This coupling, in turn, is dependent on many factors including the area ratio between the receiver antenna and the room antenna. The receiver antenna, however, may be limited in size by the size of the portable device that incorporates it. Parasitic antennas can have a large enough area to allow them to receive and re transmit the power as necessary.

Another important feature is the quality factor of the antennas. The parasitic antenna can have higher Q factors, since it can be hidden and of any size.

An embodiment using low-frequency may in general may use more terms of an inductor then those used at high frequencies. One embodiment may use multiple turns on the antenna material as part of the antenna 100 and also the parasitic antenna. One embodiment may use stranded wire, such as "Litz wire" to compensate for the increased ohmic losses caused by the increased number of turns. The ohmic losses can be reduced using low resistance wire.

Litz wire is a special kind of stranded wire, where each single-strand is electrically isolated from the other strand. Litz wire increases the effective cross-sectional area of the wire, and thereby partially compensates for the skin and proximity effect.

More generally, an embodiment may use any material that increases the effective cross sectional area of a wire used for the antenna without increasing an actual cross sectional area of the wire The following illustrates differences between conventional wire and Litz wire.

DC resistance of a conventional wire: $R_{DC} = \frac{N}{\sigma \cdot b^2 \cdot \pi} \cdot 2\pi \cdot r_A$ AC resistance of a conventional wire: $R_{AC} = \frac{N}{2 \cdot b} \cdot \sqrt{\frac{f \cdot \mu_0}{\sigma \cdot \pi}} \cdot 2\pi \cdot r_A \cdot (\alpha + 1)$ AC resistance of litz wire: $R_{AC-lks} = \frac{N}{\sigma \cdot b^2 \cdot \pi \cdot \xi} \cdot 2\pi \cdot r_A$ $N$ = Number of turns [1]

$\sigma$ = Electrical conductivity [S/m]

$b$ = Wire radius (without isolation) [m]

$r_A$ = Antenna circular loop radius [m]

$f$ = Frequency [Hz]

$\mu_0$ = Permeability constant [H/m]

$\alpha$ = Proximity effect coefficient [1]

$\xi$ = Litz wire packaging factor (in the range of 0.4-0.6) [1]

Based on calculations and simulations, the applicants have found that the AC resistance of Litz wire is about 50-80% lower than the AC resistance of a comparable conventional wire that has the same Inductance of the eventual antenna may be an extremely important factor in the antenna's efficiency of operation. The inductance can be expressed as $$L_A = \mu_0 \cdot N^2 \cdot \frac{A_A}{K_A}$$

$A_A$ = Area of the antenna $K_A$ = antenna shape factor

The factor $\kappa_A$ is dependent of the shape of the antenna. For a rectangular antenna $\kappa_A$ is given by $$K_{\lambda-rect} = \frac{A_A \cdot \pi}{-2(w+h) + 2 \cdot gswh - h \cdot \ln\left(\frac{h+gswh}{w}\right) - w \cdot \ln\left(\frac{w+gswh}{h}\right) + h \cdot \ln\left(\frac{2 \cdot w}{b}\right) + w \cdot \ln\left(\frac{2 \cdot h}{b}\right)}$$

$w$ = Width of the antenna [m]

$h$ = Height of the antenna [m]

$gswh = \sqrt{w^2 + h^2}$ [m]

For a circular antenna, $\kappa_A$ is given by $$K_{\lambda-circ} = \frac{r_A \cdot \pi}{\ln\left(\frac{8 \cdot r_A}{b} - 2\right)}$$

The radiation resistance of a loop antenna is given by $$R_{ret} = 320 \cdot \pi^4 \cdot \left(\frac{A_A}{\lambda^2}\right)^2 \cdot N^2$$

$\lambda$ = Wavelength of operating frequency [m] (2206.8 m for 135 kHz)

Characteristics of the active antenna can also be calculated using these formulas. The total resistance of this antenna is formed by the ohmic loss $R_{AC}$, the radiation resistance $R_{rad}$ and the medium loss resistances $R_{med}$. The medium loss resistances models the losses from the room in which the antenna is installed. Metallic parts within the room act like a medium. This medium can be defined according to its complex permeability $\mu_{med} = \mu_r' \cdot j \mu_r''$ $\mu_r'$ = Real part of relative permeability
$\mu_r''$ = Imaginary part of relative permeability
Based on this, the medium loss resistance is defined as $R_{med} = 2\pi \cdot f \cdot \mu_r'' L_A$ where u"r can be measured, as the relative permeability of the medium, for example as $\mu_{med} = 1 + j \cdot 0.0018$ This value may change for different rooms, where each room will define its own media.

Figure 2:
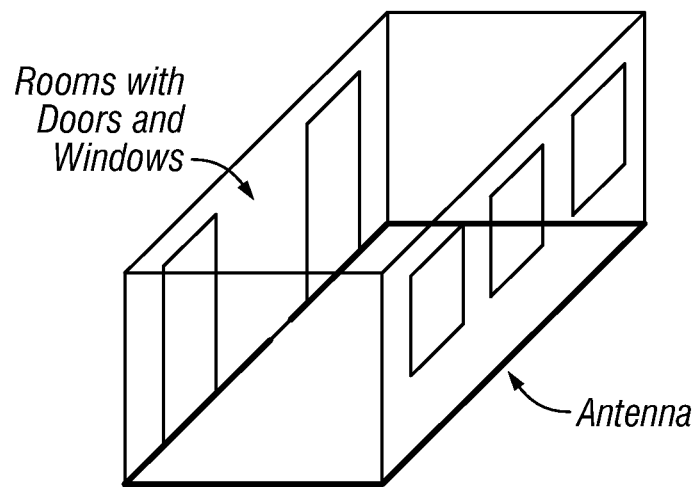
FIG. 2 shows an antenna around edges of a room.

FIG. 2 illustrates the room antenna, also called the long-range antenna. This antenna may be long-range by virtue of its size. Larger antennas of this type usually have a better capability of coupling magnetic power to a recipient. The embodiment uses a special test room which had an approximate size of 12 m×5.5 m. The antenna can be mounted at the height of the table on which the items will be located, but can also be located on the floor, where it can be more easily hidden.

One embodiment built the test antennas from RG 213 U coaxial cable. Only the outer conductor of this coaxial cable was used. In this embodiment, since the antenna is large, a self capacitance system can be used.

The embodiment of FIG. 2 uses four turns on the ground surrounding the complete perimeter of the room. The measured values were

| L [µH] | R [Ω] | C [nF] | Q [1] |
|--------|-------|--------|-------|
| 700    | 26    | 2.0    | 23    |

Other embodiments may have different values. In this embodiment, Q was lower than expected because of properties of the room.

It was found by experimentation that a single turn antenna in fact in this medium provided the same performance as a multiple turn antenna. For example, different parameters for different heights produced similar values.

| L [µH] | R [Ω] | C [nF] | Q [1] |
|--------|-------|--------|-------|
| 456    | 7.5   | 3.1    | 52    |
| 4 turns at 0.4 m | | | |
| 43     | 0.8   | 32.3   | 46    |

1 turn at 1.3 m

The antenna can also be removed from the walls by about 1 m, and placed on different heights off the ground. The following shows results for antennas spaced from the wall by 1 m.

| L [µH] | R [Ω] | C [nF] | Q [1] |
|--------|-------|--------|-------|
| 30.9   | 0.42  | 45.0   | 62    |
| 1 turn at 0.8 m | | | |
| 31.1   | 0.4   | 44.7   | 66    |

1 turn at 2.0 m

Figure 3:
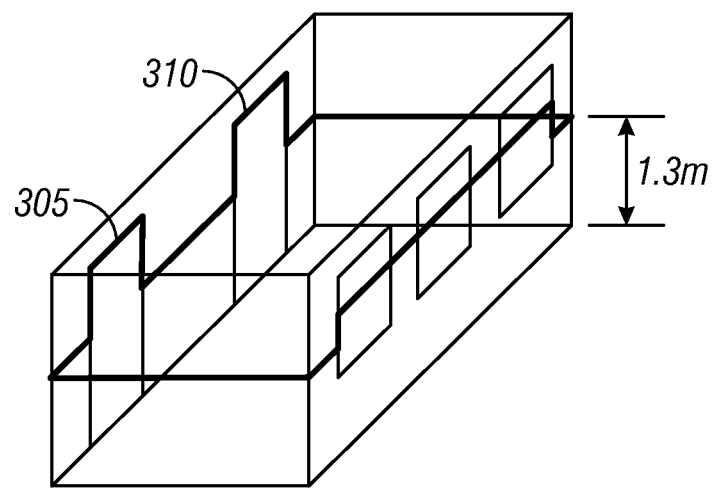
FIG. 3 shows the antenna at different levels in the room to go around doors and windows.

Another embodiment, shown in FIG. 3 includes the antenna lifted off the ground by some amount, and also lifted at the areas 305, 310 to go around doors and windows. Measured values for this antenna are as follows:

| L [µH] | R [Ω] | C [nF] | Q [1] |
|--------|-------|--------|-------|
| 42.34  | 1.06  | 33.26  | 33.7  |

1 turn at 1.3 m (lifted 1.8 m at the windows and 2.1 m above the doors)

Figure 4:
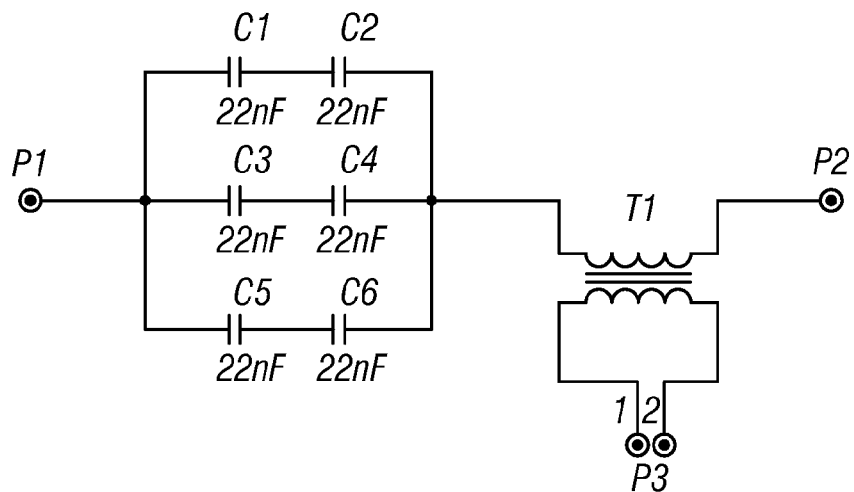
FIG. 4 shows matching circuitry for the parasitic antenna.

The long range antenna 100 may carry a high power. A circuit for the antenna which provides LC values and 50 ohm matching is shown in FIG. 4. According to an embodiment, a special capacitor bank and coupling transformer is used to the antenna. The values of this device may be:

C1-C6: 22 nF/900 VAC capacitor Type PHE450 from Revox Rifa
P1/P2 Female UHF-connector, designed for RG 213 U cable
P3: Female N-connector
T1: 2× transformer 1:7. each with 2 ferrite cores of the type B64290-L659-X830, made of N30 material, secondary winding made of 3 mm HF litz wire (120×0.1 mm Ø).

In an embodiment, the antenna may carry a power rating of approximately 150 W. However, at power levels that are close to this power rating, the capacitor bank carries a current of 12 amps, total voltage of 400 V. This corresponds to a reactive voltage of 4.8 kVA.

Accordingly, in an embodiment, the capacitor bank is provided on the secondary side of the transformer. Placing the capacitor bank on the primary side of the transformer requires the reactive power to pass through the transformer and to thereby oscillate between the inductance and capacitance. This would increase the transformer size.

Many rooms include many metal objects, and hence are inherently lossy. The antenna is also intended to have a reasonably large size. Accordingly, the characteristics of this system make it inherently immune from the approaching and moving of people. In essence, this is because the area covered by any person is typically small, e.g., less than 10% of, the area of the antenna. No tuning of this antenna will typically be necessary because of these inherent features.

Figure 5:
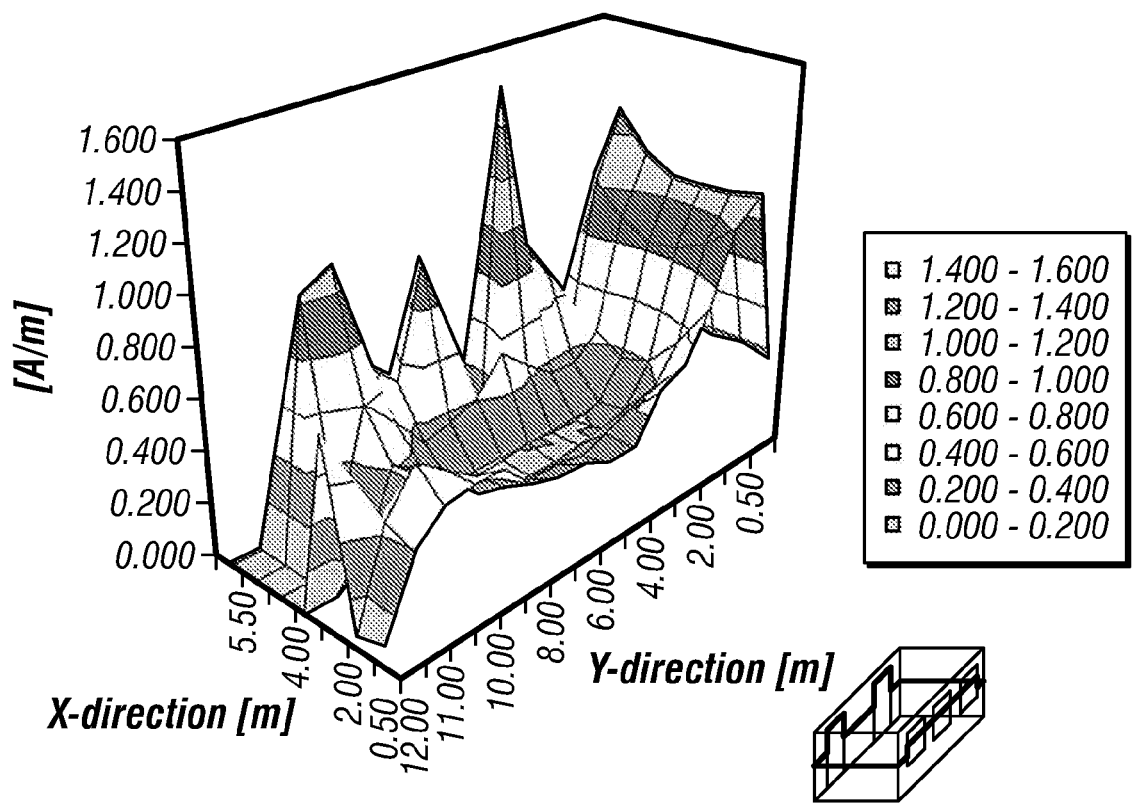
FIG. 5 shows a field strength distribution.

In operation of an embodiment, the fixed installation of the long-range antenna creates a magnetic field throughout the entire test room creating a transmit power of about 60 W. Actual results as measured are shown in FIG. 5. This three-dimensional graph shows peaks along the wall due to cable loops around doors and at the peak points. The field strength also increases towards the back wall because this wall has less metallic part in the test room compared to other walls. The field strength is reduced at the window side due to the metallic frames of double glazed windows.

One embodiment may exploit this effect by placing loops of antennas along certain walls, e.g., in areas of the room that either need more signal, or just in general.

Appropriate design of the antenna loop might minimize these hotspots or provide supplemental antennas to these hotspots. In the central part of the room the field strength is often nearly constant.

The power scales according to the square root of the transmit power. Therefore, doubling the transmit power may increase the power density in the room by $\sqrt{2}$.

The magnetic field in the room was also measured, and stays within safety limits at all points at 60 watts of transmitted power.

Figure 6:
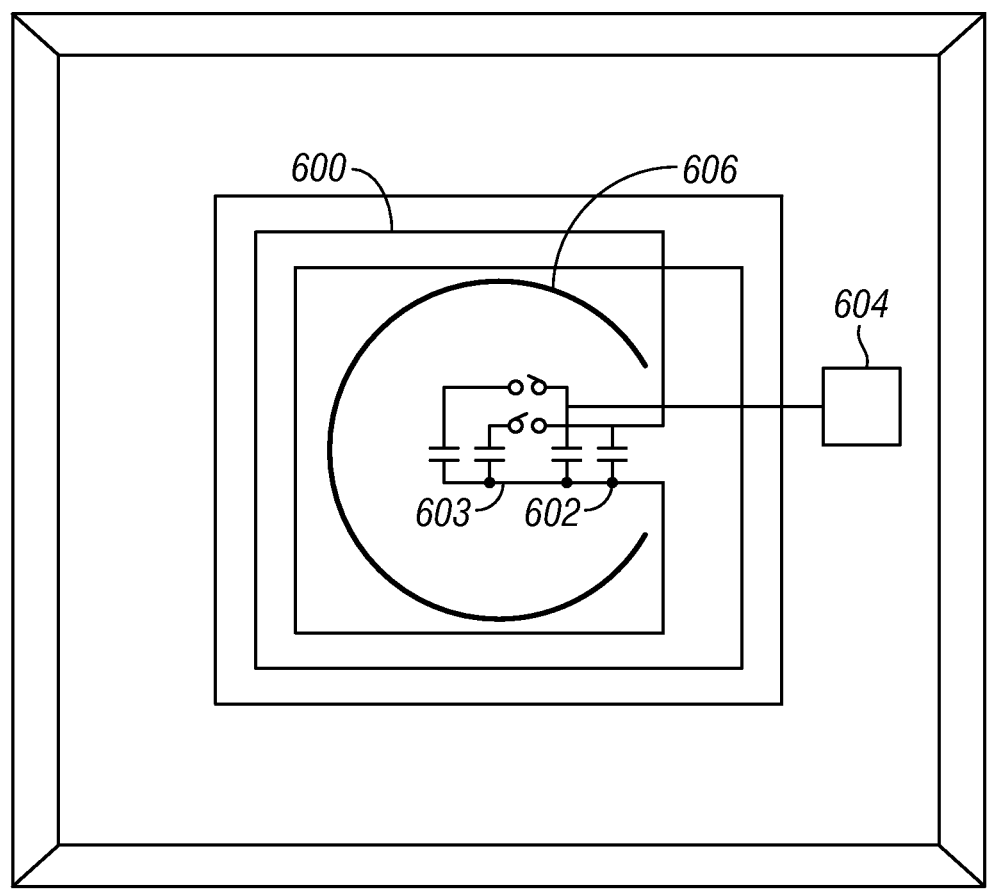
FIG. 6 shows a parasitic antenna.

FIG. 6 illustrates a parasitic antenna used according to an embodiment. A first embodiment uses a 14 turn loop 600, formed of 120×0.1 mm diameter high frequency Litz wire. The inductance of the loop is influenced by a number of factors including turn-by-turn spacing, where smaller spacing between the turns results in a higher inductance and therefore a higher quality factor.

In the embodiment, the turns are filled with hot glue to secure exact position. A guide may also be used. The lower limit for the turn to turn spacing is the necessary withstanding voltage of the antenna. For example, at 20 W, there may be a 1K reactive voltage, leading to a turn-to-turn voltage of 75 V. The antenna shown in FIG. 6 includes a 14 turn loop 600 forming the inductance and a single turn "coupling loop" 606 unconnected to the main loop 600. FIG. 6 shows the antenna built into a picture frame.

The capacitance of the parasitic antenna is formed by a bulk capacitance 602 and a variable capacitance. The variable capacitance in this embodiment is formed by a step switch 604 which controls switching of a capacitor bank 603.

Figure 7:
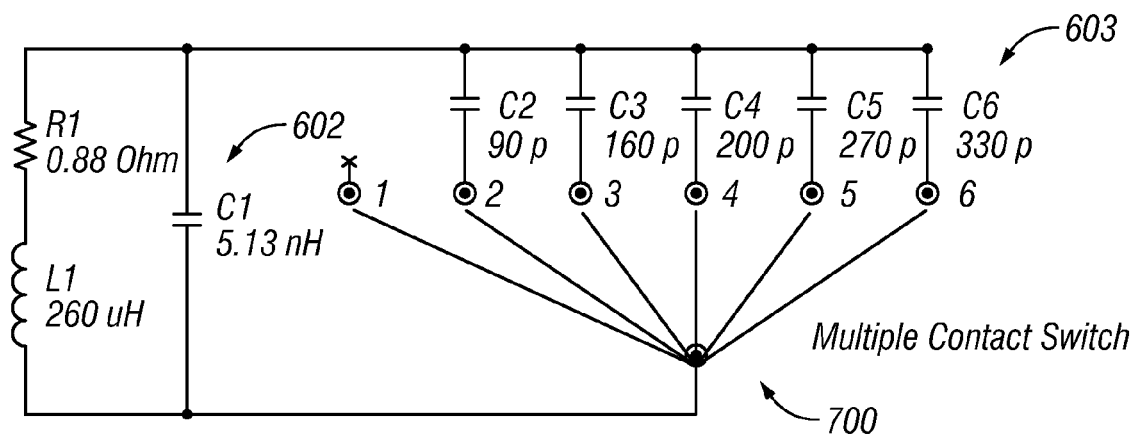
FIG. 7 shows a schematic of switching capacitors.

FIG. 7 illustrates a capacitor bank that can be used to tune the parasitic antenna The bulk capacitance 602 to may be in parallel with the tunable capacitance 603 connected via a multiple contacts switch 700. The switch position 1 is no extra capacitance, and provides only the bulk capacitance. According to an embodiment, this provides a resonant frequency of 137 kHz. More capacitance can be added in parallel with the capacitor bank by changing to different switch positions. Position 2 provides 90 pf capacitance, for example, and position 3 provides 160 pF. 135 kHz resonant frequency is realized at position three. Position 6 (330 pf) may tune the frequency to 132 khz.

The antenna may be detuned by nearby metallic objects and the frequency shift can be corrected by adding more capacitance. The additional capacitance may lower the quality factor as the LC ratio of the resonant circuit is lowered.

Each metallic object inside the generated magnetic field of an antenna compensates a portion of the antenna's total inductance thus results in raising the resonant frequency of the antenna. The antenna does not have a substantial electric field. Accordingly, the presence of dielectric materials has very little impact on the antenna. Therefore, low-frequency antennas of the type in an embodiment have resonant frequencies which shift upward due to detuning effects. A tuning compensation system according to the present system may accordingly always pull down the resonance to provide a non-symmetrical tuning range.

The parasitic antenna of an embodiment has the following characteristics:

| | |
|---|---|
| Nominal frequency [kHz] | 135 |
| Tuning range (coarse tuning) [kHz] | 132-137 (in 5 steps) |
| Tuning range (fine tuning) [kHz] | +/−0.25 |
| Quality factor | 250 |
| Inductivity [μH] | 260 |
| Bulk capacitance [nF] | 5.13 |
| Maximum power capability | 20 W (approx.) |
| Number of turns | 14 |
| Wire | Litz wire 120 × 0.1 mm Ø |
| Size | 0.7 × 0.5 m (average turn size) |

Another embodiment may use multiple small capacitors that add together to increase the overall capacitance.

Yet another embodiment may use semiconductor switches or relays to change the capacitance.

Figure 8:
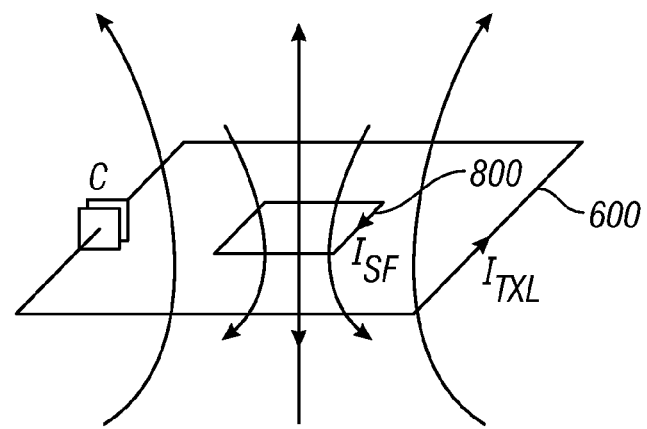
FIG. 8 shows the field strength.

Another compensation system is shown in FIG. 8. This provides a short circuited loop part 800 within the field of the parasitic antenna 600. This causes a portion of the H field to be compensated, thereby lowering the inductance of the parasitic antenna. A lower inductance leads to a higher resonant frequency with a constant capacitance. Accordingly, this technique can also be used to tune the resonant frequency of the antenna. The amount of compensation of the resonant frequency is dependent on the ratio between the areas of the main transmit antenna 600 and the area of the compensation antenna 800. The area of the short-circuited loop defines the amount of influence—where a smaller loop has less influence than a larger one.

A conceivable disadvantage of this technique is that the short-circuited loop lower the overall Q factor of the parasitic antenna.

Figure 9:
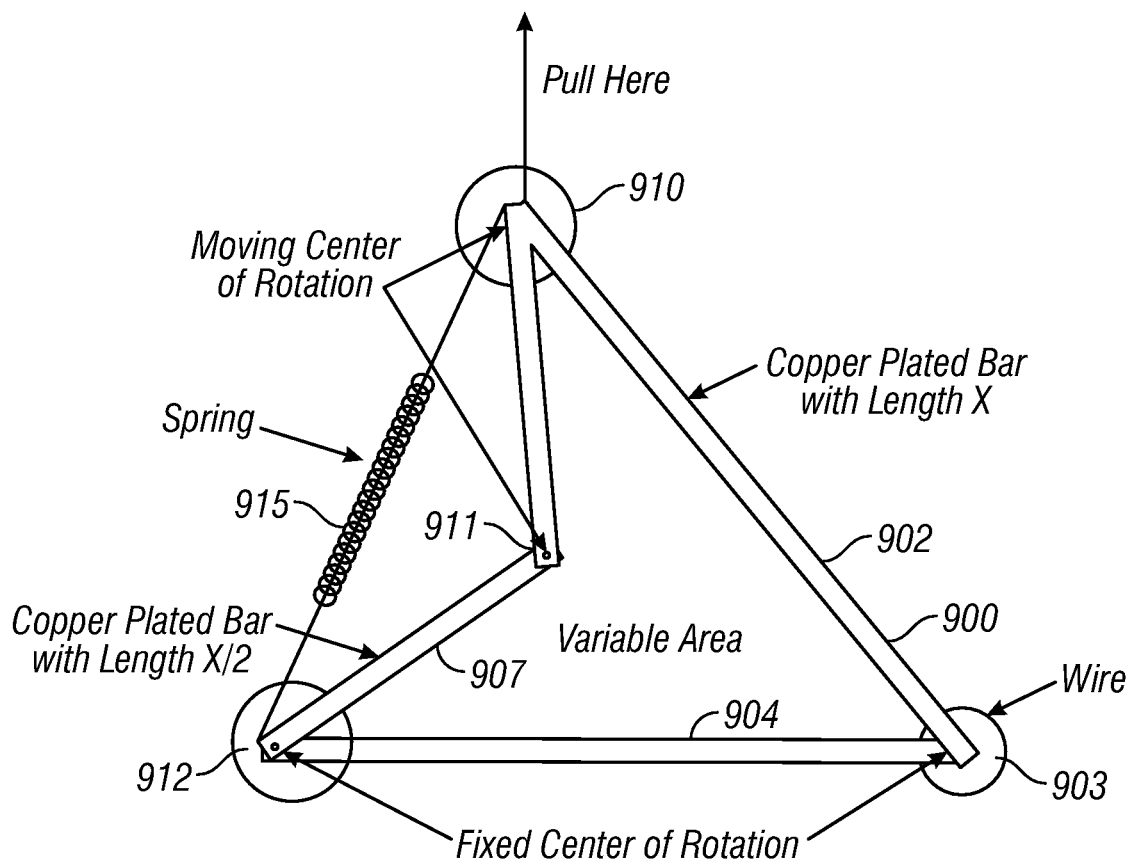
FIG. 9 shows a variable area antenna.

Another embodiment may implement a short-circuited loop which is mechanically changeable in area. FIG. 9 illustrates an embodiment where a loop has a variable area by virtue of the ability to move its characteristics. The loop in FIG. 9 is a triangular loop with copper plated bars. First bar 902 and second bar 904 are connected together via center rotatable couplings such as 903. The bars 902, 904 are also connected together via movable parts 906, 907. The parts 906, 907 can be varied with reference to one another, and pivoted on the portions 910, 911, 912. A spring 915 may assist in folding and unfolding the antenna. In the embodiment, the main bars 902, 904 are of length X, and the folding bars 906, 907 are of length X/2. The triangle is deformed by pulling the upper corner of the triangle. However, when the pulling force gets less, the spring 915 closes the triangle and makes a smaller area.

Different shapes including rectangles and trapezoids could also be used for this purpose.

Figure 10:
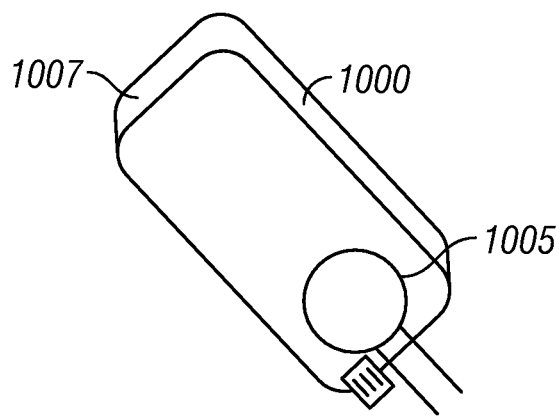
FIG. 10 shows a coupling loop and antenna.

A receiver antenna is illustrated in FIG. 10. According to this embodiment, the receiver antenna can be formed of a 70 turn loop of high frequency litz wire. The receiver antenna 1000 can have turns wound in five layers with 14 turns on each layer. This can form a rectangular profile where in essence a stack 1007 of wires defines a perimeter that can be integrated around the edge of a mobile device. The antenna parameters are shown as:

| | |
|---|---|
| Nominal Frequency [kHz] | 135 |
| Tuning range [kHz] | 133-135 |
| Quality factor | 175 |
| Inductivity [μH] | 625 |
| Bulk capacitance [nF] | 2.2 |
| Maximum power capability | 2 W (approx.) |
| Number of turns | 70 |
| Wire | Litz wire 75 × 0.05 mm Ø |
| Size | 90 × 40 mm (average turn size) |

This system can also use a coupling loop which is wholly separate from the receiving antenna. The coupling loop can be a three turn loop 1005, for example.

Figure 11:
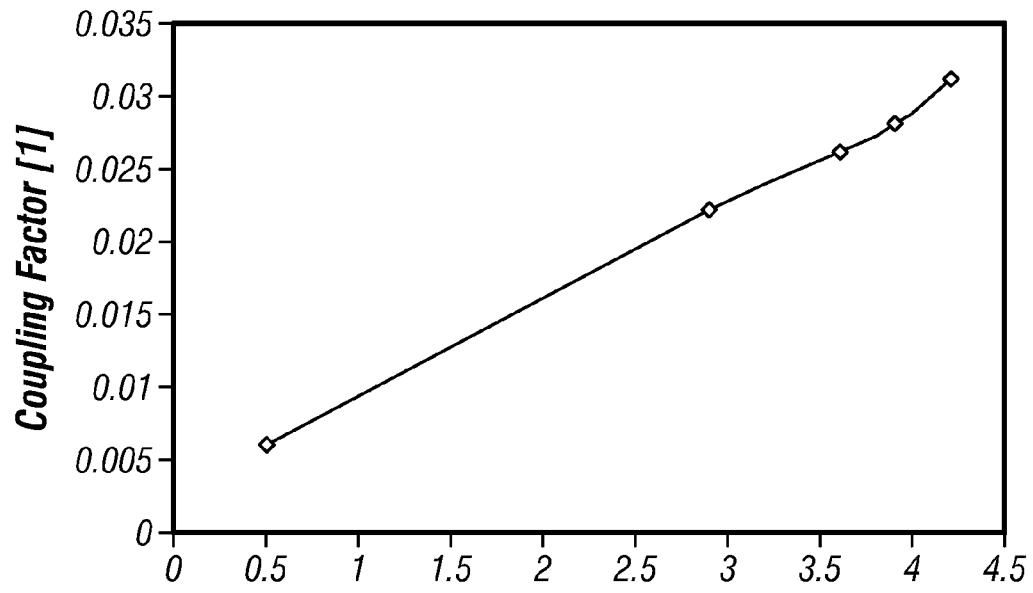
FIG. 11 shows detuning vs coupling factor.

Antenna detuning may occur when coupling between antennas increases and the antennas begin influencing the inductance of one another and thus influence the resonant frequencies. This causes a strong detuning of the antennas. Hence, when a wireless receiver gets too close to the parasitic loop, decoupling can occur. Simulation and measurement produces the graph of FIG. 11 which shows the impact of coupling factor to the power transfer between two antennas.

An adjustable coupling between antennas may be used to avoid this detuning. Multiple taps can be added to the antenna turns and used as coupling loops. The strength of the coupling can be changed by switching between the taps.

System efficiency defines how the system transfers power to the receiver. System efficiency is defined by transfer efficiency between the long-range antenna and parasitic loop; transfer efficiency between the long-range antenna and the receiver and transfer efficiency between the long-range antenna to parasitic loop to receiver.

Figure 12A:
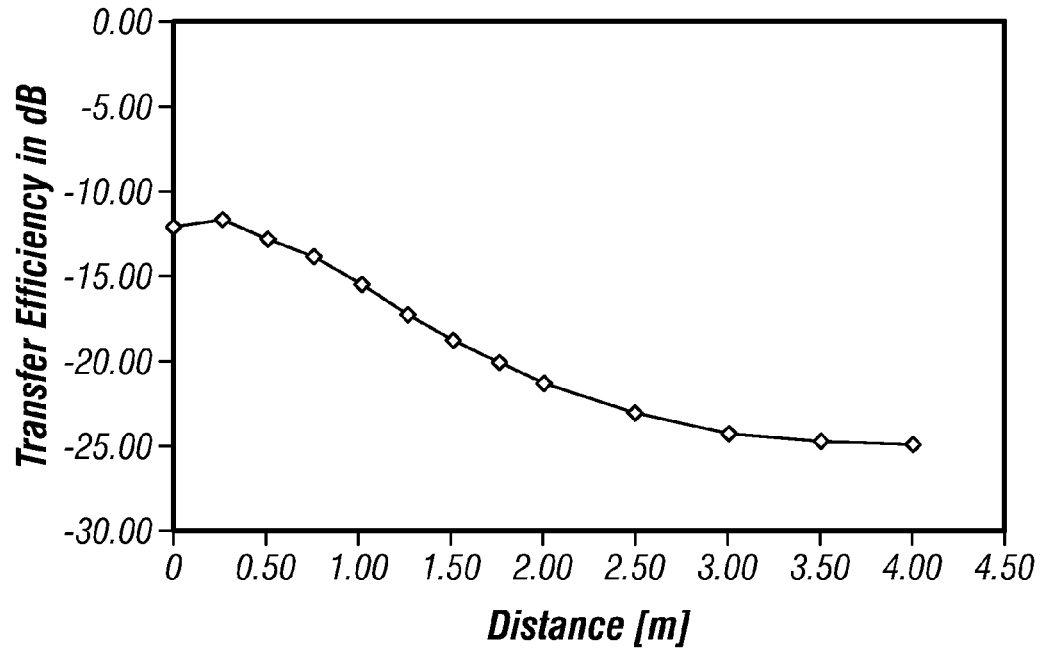
FIGS. 12A and 12B show transfer efficiency.
Figure 12B:
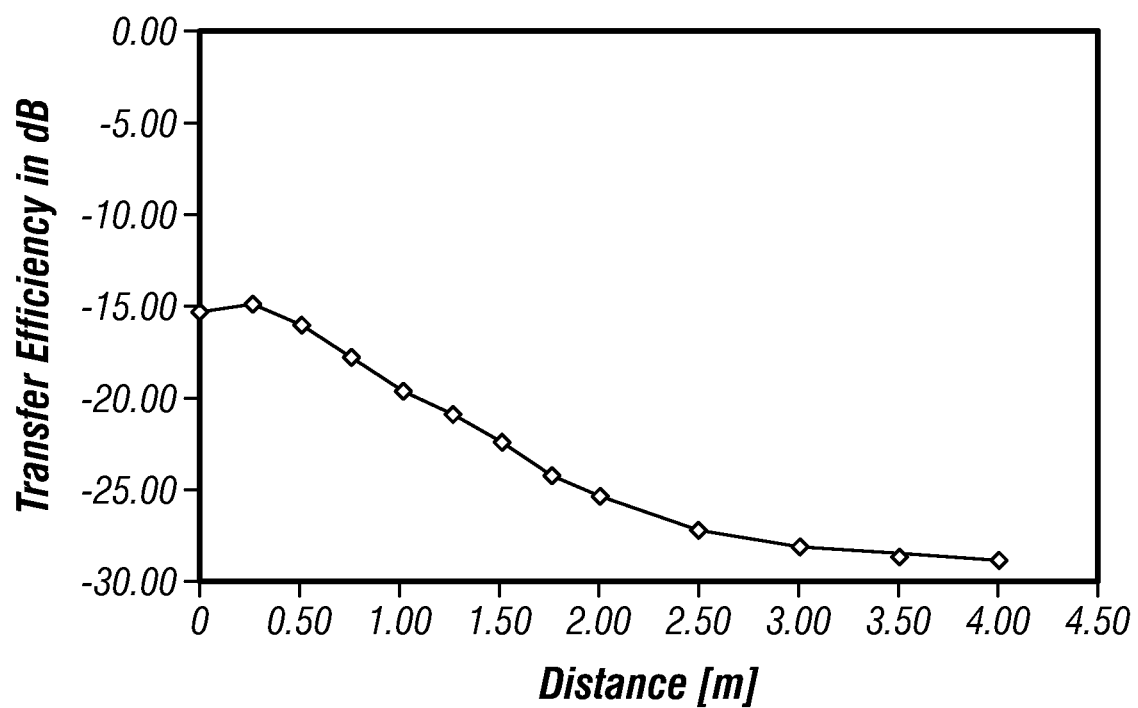

Exemplary results are shown in FIGS. 12A and 12B for the specific test setup described herein. FIG. 12A shows the single hop transfer efficiency, while FIG. 12 B shows the double hop transfer efficiency.

The measurements given above confirm that use of parasitic antennas can compensate for losses which would otherwise occur due to room boundaries. The parasitic antennas allow better use of the existing materials. Moreover, these can stay within IEEE and NATO defined exposure limit of 125.4 amps per meter at 130 kHz, which can be met at any point in the room at a transmit power of 60 W using a parasitic antenna.

Although only a few embodiments have been disclosed in detail above, other embodiments are possible and the inventors intend these to be encompassed within this specification. The specification describes specific examples to accomplish~more general goal that may be accomplished in another way. This disclosure is intended to be exemplary, and the claims are intended to cover any modification or alternative which might be predictable to a person having ordinary skill in the art. For example, other sizes, materials and connections can be used. Other structures can be used to receive the magnetic field. In general, an electric field can be used in place of the magnetic field, as the primary coupling mechanism. Other kinds of magnets and other shapes of arrays can be used.

Also, the inventors intend that only those claims which use the-words "means for" are intended to be interpreted under 35 USC 112, sixth paragraph. Moreover, no limitations from the specification are intended to be read into any claims, unless those limitations are expressly included in the claims.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A system for wirelessly transferring power to a device, the system comprising:
   a wireless power transmitter including a transmitting antenna of a first dimension, the transmitting antenna being configured to resonate at a resonant frequency and to transmit wireless power via a first wireless field; and
   a repeater antenna having a second dimension that is different than the first dimension, the repeater antenna being configured to resonate at substantially the same resonant frequency and retransmit wireless power received from the wireless power transmitter via a second wireless field, the repeater antenna having a short-circuited portion configured to adjust a resonant frequency of the repeater antenna.

2. The system as in claim 1, wherein said repeater antenna includes an inductive loop and a capacitor having a capacitance value.

3. The system as in claim 2, wherein said inductive loop comprises a stranded wire with strands that are electrically isolated from one another.

4. The system as in claim 2, wherein said inductive loop comprises a material that increases an effective cross sectional area of a wire used for the antenna without increasing an actual cross sectional area of the wire.

5. The system as in claim 2, wherein said repeater antenna includes a tuning part that is adjustable to change a resonant frequency of said repeater antenna.

6. The system as in claim 5, wherein said tuning part includes a component having a variable capacitance.

7. The system as in claim 6, wherein said component having the variable capacitance includes a switched capacitor.

8. The system as in claim 5, wherein said tuning part is configured to only decrease the resonant frequency.

9. The system as in claim 5, wherein said shorted-circuit portion short circuits a portion of said inductive loop.

10. The system as in claim 9, wherein said tuning part has a variable size and is configured to change an area of the inductive loop.

11. The system as in claim 10, wherein said tuning part is triangular.

12. The system as in claim 1, wherein said transmitting antenna surrounds a perimeter of a room.

13. The system as in claim 12, wherein said transmitting antenna is at different height levels in the room.

14. The system as in claim 1, wherein said wireless power transmitter includes a frequency generator and a matching system, said matching system including a coupling transformer and a capacitor on a secondary side of said wireless power transmitter.

15. The system as in claim 1, wherein said second size is smaller than said first size.

16. The system as in claim 1, wherein said repeater antenna includes an inductive loop having a capacitance value.

17. The system as in claim 1, wherein the transmitting antenna encompasses a first antenna area, and wherein the repeater antenna is configured to retransmit the received power in a second antenna area that corresponds to an area within the first antenna area.

18. The system as in claim 1, wherein at least one of the transmitting antenna or the repeater antenna comprises at least one tapped coil that is adjustable to vary a level of coupling between the transmitting antenna and the repeater antenna.

19. The system as in claim 1, wherein the repeater antenna is configured to have a same orientation with respect to at least one of the first wireless field or the second wireless field.

20. The system as in claim 1, wherein the transmitting antenna and the repeater antenna are substantially coplanar.

21. A system for wirelessly transferring power from a transmitting antenna to a device, the system comprising:
   a repeater antenna having a first dimension, the repeater antenna being tuned to resonate at a resonant frequency and receive wireless power transferred via a first wireless field from the transmitting antenna having a second dimension that is different than the first dimension, the transmitting antenna being configured to resonate at substantially the same resonant frequency, the repeater antenna configured to retransmit the received wireless power via a second wireless field, the repeater antenna having a short-circuited portion configured to adjust the resonant frequency of the repeater antenna.

22. The system as in claim 21, wherein said repeater antenna includes an inductive loop and a capacitor having a capacitance.

23. The system as in claim 22, wherein said inductive loop comprises a material that increases an effective cross sectional area of a wire used for the repeater antenna without increasing an actual cross sectional area of the wire.

24. The system as in claim 23, wherein said inductive loop comprises a stranded wire with strands that are electrically isolated from one another.

25. The system as in claim 22, wherein said repeater antenna includes a tuning part that is adjustable to change a resonant frequency of said repeater antenna.

26. The system as in claim 25, wherein said tuning part includes a component having a variable capacitance.

27. The system as in claim 25, wherein said tuning part is configured to only decrease said resonant frequency.

28. The system as in claim 27, wherein said component having the variable capacitance includes a switched capacitor.

29. The system as in claim 25, wherein said short-circuited portion short circuits a portion of said inductive loop.

30. The system as in claim 29, wherein said tuning part has a variable size and is configured to change an area of the inductive loop.

31. The system as in claim 30, wherein said tuning part is triangular in its outer shape.

32. The system as in claim 21, wherein said repeater antenna includes an inductive loop having a capacitance value.

33. The system as in claim 21, wherein the transmitting antenna encompasses a first antenna area, and wherein the repeater antenna is configured to retransmit the received power in a second antenna area that corresponds to an area within the first antenna area.

34. The system as in claim 21, wherein at least one of the transmitting antenna or the repeater antenna comprises at least one tapped coil that is adjustable to vary a level of coupling between the transmitting antenna and the repeater antenna.

35. The system as in claim 21, wherein the repeater antenna is configured to have a same orientation with respect to at least one of the first wireless field or the second wireless field.

36. The system as in claim 21, wherein the transmitting antenna and the repeater antenna are substantially coplanar.

37. A system, comprising:
a wireless power transmitter configured to generate a wireless power transmission field at a specified frequency; and
a transmitting antenna coupled to the wireless power transmitter and having a first antenna area, the transmitting antenna being configured to transmit wireless power at the specified frequency, the transmitting antenna having an antenna loop that extends around a perimeter of the first antenna area, the antenna loop having an inductance, the transmitting antenna having a capacitance, the inductance and the capacitance corresponding to an LC value causing the transmitting antenna to be substantially resonant at the specified frequency, the antenna loop having a first section at a first level and a second section at a second level that is different than the first level.

38. A system as in claim 37, further comprising a parasitic antenna, the parasitic antenna having a second antenna area that is smaller than the first antenna area, the parasitic antenna configured to retransmit the wireless power in the second antenna area.

39. The system as in claim 37, wherein the antenna loop includes a third section which extends between the first and second sections.

40. The system as in claim 21, wherein the capacitance of the wireless power transmitter corresponds to the capacitance of the antenna loop.

41. The system as in claim 37, further comprising a parasitic antenna having a portion that is short-circuited to adjust a resonant frequency of the parasitic antenna.

42. The system as in claim 37, further comprising a parasitic antenna, wherein at least one of the transmitting antenna or the parasitic antenna comprises at least one tapped coil that is adjustable to vary a level of coupling between the transmitting antenna and the parasitic antenna.

43. The system as in claim 37, further comprising a parasitic antenna, the parasitic antenna configured to have a same orientation with respect to the wireless power transmission field.

44. A method of wireless transferring power, comprising:
transmitting wireless power from a first antenna via a first wireless field, the first antenna having a first dimension and configured to resonate at a resonant frequency;
retransmitting power received via the first wireless field with a second antenna within a range of the first antenna to a portable device to power the portable device via a second wireless field, the second antenna having a second dimension that is different than the first dimension and being configured to resonate at the resonant frequency; and
short circuiting a portion of the second antenna to adjust the resonant frequency of the second antenna.

45. The method as in claim 44, wherein said first antenna has a larger outer size than said second antenna.

46. The method as in claim 44, further comprising using a material that increases an effective cross sectional area of a wire used for the second antenna without increasing an actual cross sectional area of the wire.

47. The method as in claim 44, wherein the first transmitting antenna surrounds a perimeter of a room.

48. The method as in claim 47, wherein said first transmitting antenna is at different height levels in the room.

49. The method as in claim 44, further comprising tuning a resonant frequency of a repeater antenna.

50. The method as in claim 49, wherein said tuning comprises changing a value of a component having a variable capacitance.

51. The method as in claim 49, wherein said tuning comprises short circuiting a portion of said inductive loop.

52. The method as in claim 44, further comprising adjusting a level of coupling between the first antenna and the second antenna.

53. The method as in claim 44, further comprising adjusting at least one of the first antenna or the second antenna such that the first antenna and the second antenna are coplanar.

54. A system for wirelessly transferring power to a device, the system comprising:
means for transmitting wireless power via a first wireless field, the means for transmitting wireless power having a first dimension and configured to resonate at a resonant frequency;
means for retransmitting wireless power received from the means for transmitting wireless power in an area via a second wireless field, the means for retransmitting wireless power having a second dimension that is different than the first dimension and being configured to resonate at substantially the same resonant frequency; and
means for short circuiting the means for retransmitting to adjust a resonant frequency of the means for retransmitting.

55. A system for wirelessly transferring power from a transmitting antenna to a device, the system comprising:
means for retransmitting wireless power via a first wireless field in an area, the means for retransmitting wireless power having a first dimension and being configured to receive power via a second wireless field from the transmitting antenna configured to resonate at a resonant frequency, the transmitting antenna having a second dimension that is different than the first dimension;
means for short circuiting the means for retransmitting to adjust a resonant frequency of the means for retransmitting; and
means for tuning the means for retransmitting wireless power to receive the wireless power from the second wireless field and cause the means for retransmitting wireless power to resonate at substantially the same resonant frequency.

56. A method of wirelessly transferring power to a device, the method comprising:
retransmitting wireless power received via a first wireless field with a repeater antenna within an area of the repeater antenna, the repeater antenna having a first dimension and being configured to receive power via a second wireless field from a transmitting antenna configured to resonate at a resonant frequency, the transmitting antenna having a second dimension that is different than the first dimension;
adjusting a resonant frequency of the repeater antenna through a short circuited portion of the repeater antenna; and
tuning the repeater antenna to resonate at substantially the same resonant frequency and receive the wireless power via the second wireless field.

* * * * *